Oct. 24, 1939.   P. H. SHERRON   2,176,980
TELEPHONE BOOTH
Filed Jan. 13, 1937   5 Sheets-Sheet 2
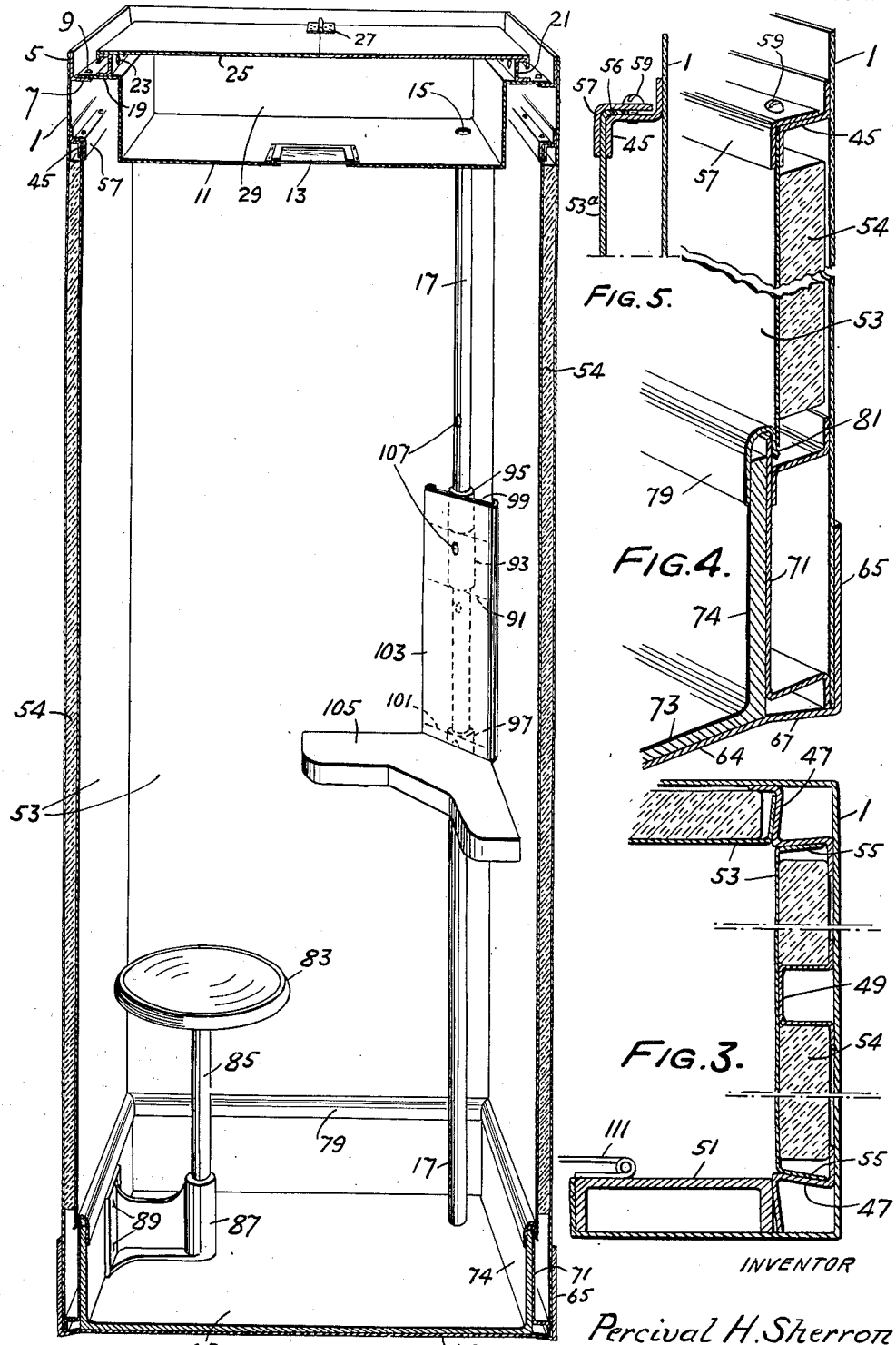
INVENTOR
Percival H. Sherron
BY
Burnett + Harding
ATTORNEYS.

Oct. 24, 1939.　　　　P. H. SHERRON　　　　2,176,980
TELEPHONE BOOTH
Filed Jan. 13, 1937　　　　5 Sheets-Sheet 3
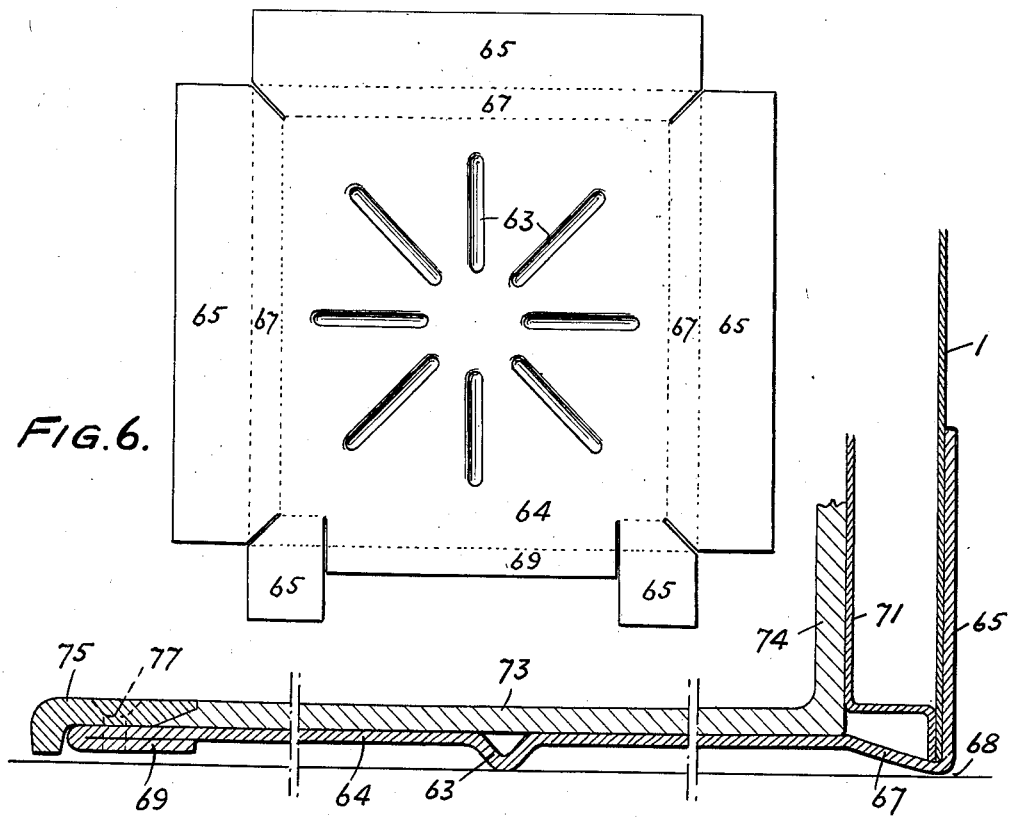
FIG. 6.
FIG. 7.
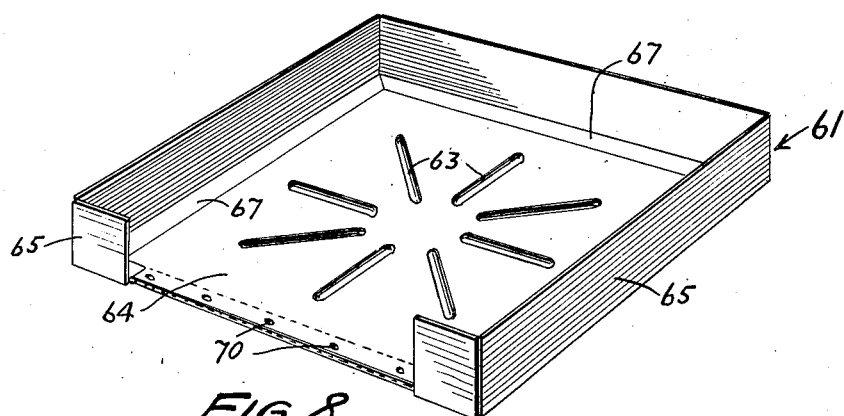
FIG. 8.
WITNESS:
INVENTOR
Percival H. Sherron
BY
ATTORNEYS.

Oct. 24, 1939.   P. H. SHERRON   2,176,980
TELEPHONE BOOTH
Filed Jan. 13, 1937   5 Sheets-Sheet 4
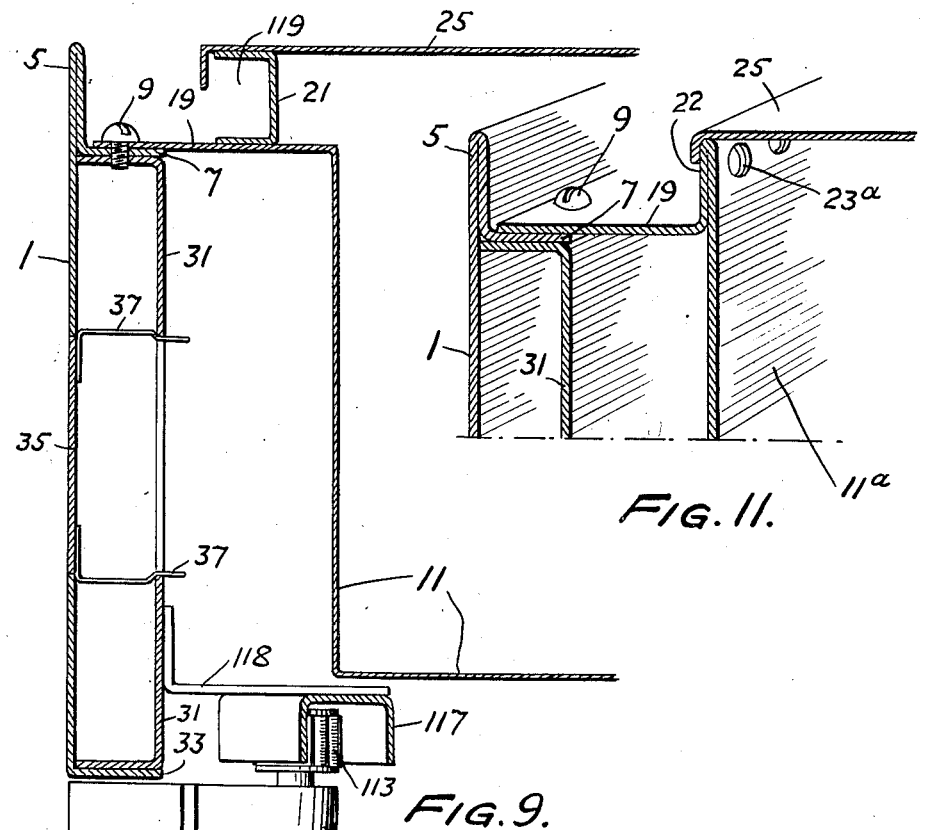
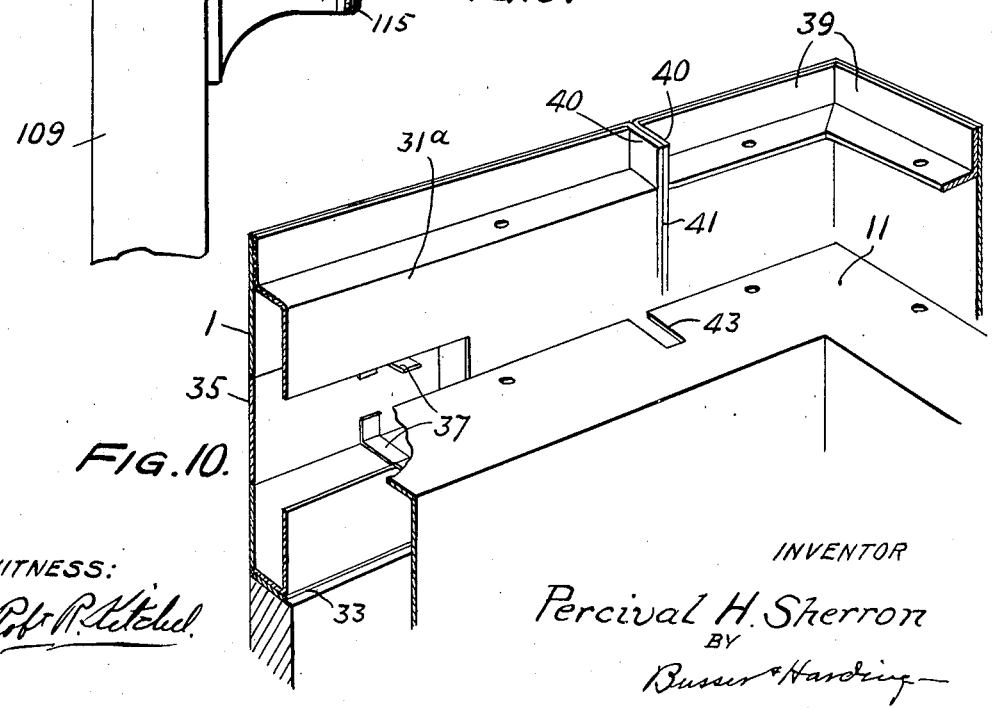
WITNESS:
INVENTOR
Percival H. Sherron
BY
ATTORNEYS.

Oct. 24, 1939.    P. H. SHERRON    2,176,980
TELEPHONE BOOTH
Filed Jan. 13, 1937    5 Sheets-Sheet 5
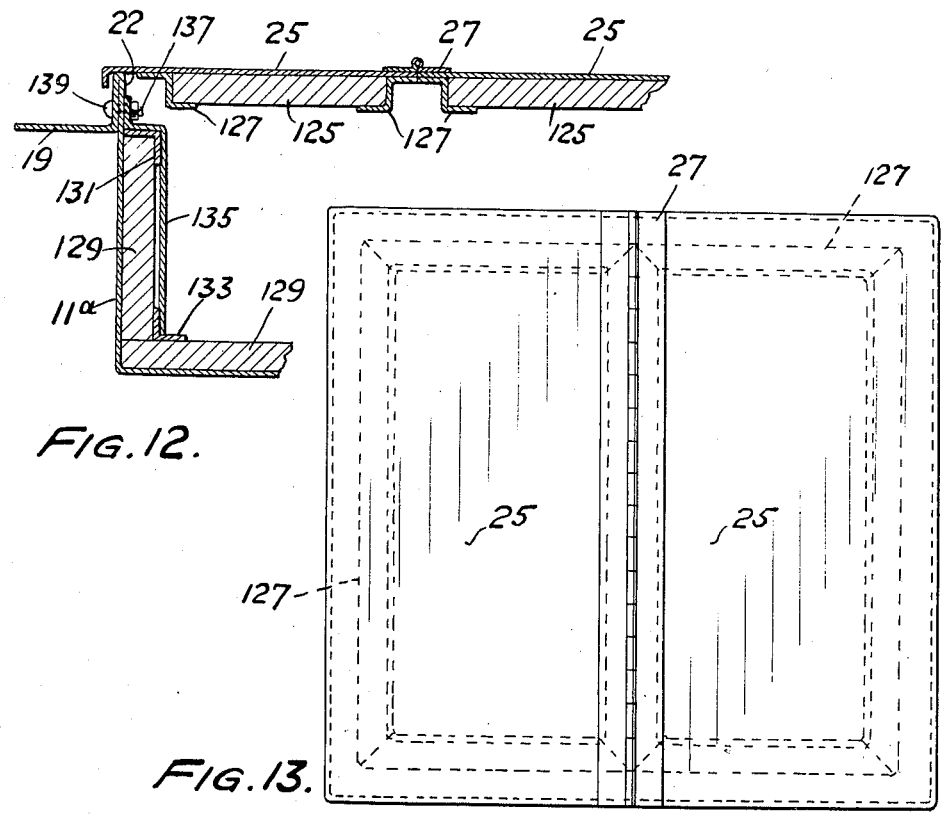
FIG. 12.
FIG. 13.
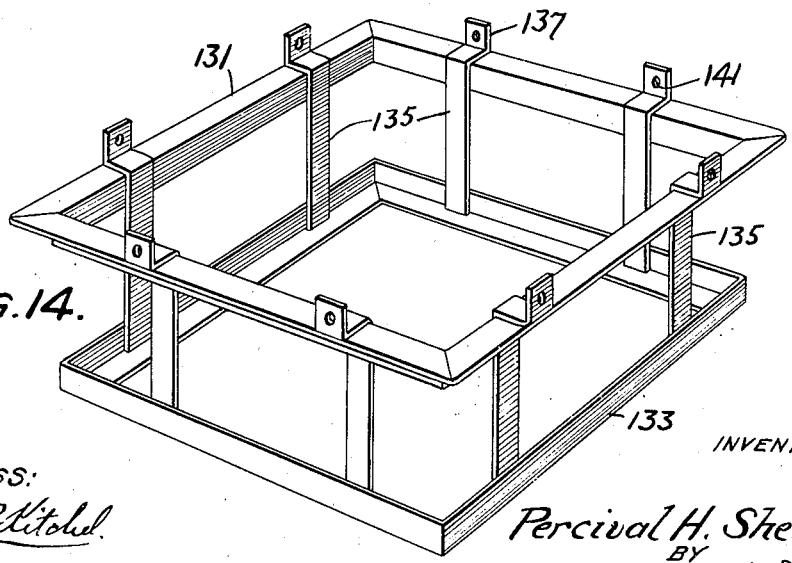
FIG. 14.
WITNESS:
INVENTOR
Percival H. Sherron
BY
ATTORNEYS.

Patented Oct. 24, 1939

2,176,980

UNITED STATES PATENT OFFICE 2,176,980

TELEPHONE BOOTH

Percival H. Sherron, Jamaica, N. Y.

Application January 13, 1937, Serial No. 120,322

9 Claims. (Cl. 189—2)

This invention relates to an improved telephone booth. It is the object of this invention to provide a fire-proof and substantially soundproof telephone booth, constructed preferably of metal, and so designed that the various structural elements thereof can be easily fabricated in quantity and readily and easily assembled.

In general the telephone booth in accordance with this invention comprises an outer shell, preferably of metal, an easily attachable and detachable inner shell or lining, also preferably formed of metal, spaced from the outer shell to provide room for sound insulating material between the shells, a removable ceiling assembly and a special floor construction.

The novel features of design and structure by means of which these objects are accomplished may best be described in connection with the accompanying drawings, which show a preferred embodiment of the invention and various modifications.

In the drawings:

Fig. 2 is a vertical sectional view of the booth.

Fig. 3 is a fragmentary horizontal sectional view of the booth.

Fig. 4 is a detail sectional view, partly broken away, of the booth wall.

Fig. 5 is a detail view showing a modification of the structure shown in Fig. 4.

Fig. 6 is a plan view of the stamping employed to form the booth floor.

Fig. 7 is a sectional view, partly broken away, of the booth floor in formed condition, showing the mode of attachment thereof to the booth walls.

Fig. 8 is a perspective view of the booth floor in formed condition.

Fig. 9 is a detail sectional view showing the manner of attachment of the ceiling assembly to the booth walls.

Fig. 10 is a detail view, in perspective, of a modified form of the structure shown in Fig. 9.

Fig. 11 is a detail view in section showing a further modified form of the structure shown in Fig. 9.

Fig. 12 is a detail sectional view of a modified ceiling and roof structure, showing sound insulation thereof.

Fig. 13 is a plan view of the sound-insulated, hinged roof.

Figure 1:
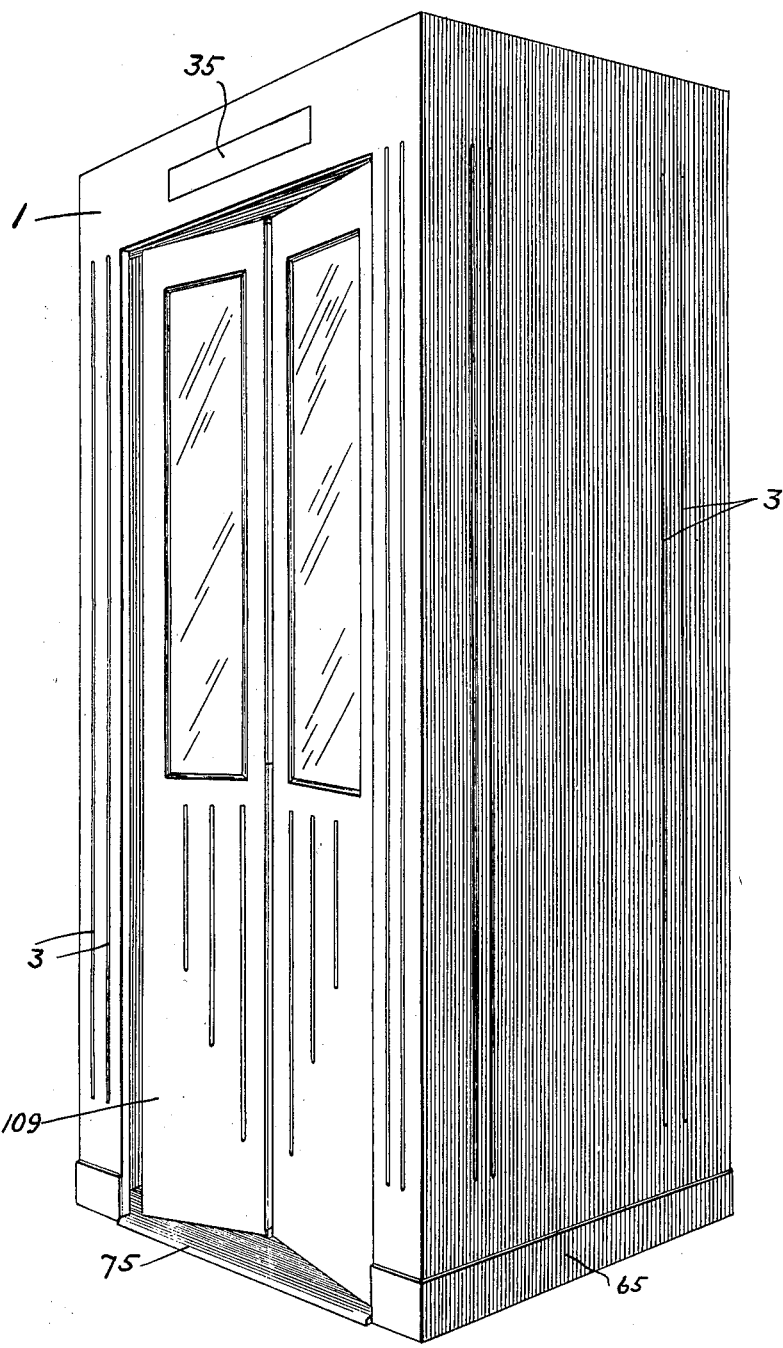
Fig. 1 is a perspective view of the improved booth.

And Fig. 14 is a view, in perspective, of the framework used to secure the sound insulation to the ceiling.

The outer wall 1 of the booth comprises a rectangular shell of sheet metal, preferably one piece, extending from the floor to the roof of the booth except for an opening in one wall forming a doorway. The outer wall may be embossed, as at 3, to give a decorative effect to the booth.

The upper edge of the outer wall 1 is folded back upon itself at 5 and then folded at right angles to form a flange 7 extending entirely around the wall 1 adjacent its upper edge. Secured to the flange 7 by means of machine screws 9 is ceiling 11, likewise formed of sheet metal. The ceiling 11 is provided with a glass-covered aperture 13, through which light from a lamp placed in the space above the ceiling may illumine the interior of the booth, and also with an opening 15 providing communication with the interior of hollow standard 17.

Secured to the flange portion 19 of the ceiling 11 and extending entirely around the ceiling is a channel member 21. The web of this channel member is punched out to form a plurality of openings 23 communicating with the space above the ceiling. Carried on the channel member, but not secured thereto, is a roof 25, medially hinged at 27 to afford easy access to the space 29 above the ceiling.

That portion of the outer wall 1 above the doorway is backed by a spacer plate 31 secured to the flange 7 and a flange 33 made by bending the lower edge of the wall 1 in at right angles where it is cut out to form the doorway. A centrally disposed rectangular aperture in this portion of the outer wall, extending through both the wall 1 and the plate 31 is closed by means of plate 35, finished to match the wall 1 and held in place by spring clips 37. The plate 35 may thus be easily removed and replaced by a plate of similar dimensions carrying any desired notice or advertisement, as "Telephone", etc.

In the modified structure shown in Fig. 11, the ceiling 11a is provided with an upstanding rib 22 formed by bending the material back on itself, and the roof 25 is supported on this rib. A plurality of openings 23a are formed in the rib 22 to provide communication with the space 29.

It is frequently desirable to provide sound-insulation for the ceiling and roof assembly. This may be done as shown in Figs. 12, 13 and 14. The roof 25 is sound-proofed by blocks or bats 125 of sound-insulating material secured to the underside thereof by means of Z-bars 127 having one flange welded to the roof panel. The ceiling assembly 11a is sound-proofed by similar blocks or bats 129 of sound-insulating material positioned between the inner walls of the assembly and a supporting framework composed of an upper frame of angle irons 131 and a lower frame of angle irons 133, secured in spaced relationship by a plurality of straps 135, the upper ends 137 of which are fastened to rib 22 of the ceiling assembly by bolts 139 passing through apertures 23a and 141.

In the construction shown in Fig. 10 the outer wall 1 is not doubled back but is strengthened at its upper edge by an angle iron 39 which extends completely around the booth except in that portion above the doorway. The ceiling 11 is then secured to the angle iron 39, while a modified backing plate 31a is secured to the wall 1 above the doorway. At one point, preferably in the front of the booth, where the one-piece outer wall 1 is joined together, flanges 40 are bent inwardly from the outer wall 1 and welded at 4 to form a projecting rib which cooperates with a corresponding slot 43 in the flange 19 of the ceiling 11 to center the ceiling in position.

Extending around three sides of the booth interior and secured to the inner face of the outer wall 1 somewhat below the top thereof, but above the level of the lower part of the ceiling 11 is a Z bar 45. In each of the corners of the booth interior are columns 47 of W-cross-section welded to the outer wall 1 and extending from the floor to the level of the bar 45. Secured to the inside of outer wall 1 medially of each of the two side wall portions thereof are two columns 49 of door spreader bar cross section, extending likewise from the floor to the level of the bar 45. An opening in the web of Z bar 45 affords communication between the interior of columns 49 and the space above the lower level of ceiling 11. A pair of channel members 51 positioned on each side of the doorway and extending from the floor to the top of the doorway support the front wall portion of outer wall 1 which is welded thereto.

Sheet metal panels 53, extending about the side and back walls of the booth, form the inner booth wall. These panels extend from the level of Z bar 45 to about six inches from the floor and completely close the space between the adjacent columns 47. Spring flanges 55 on the side edges of each panel enable the panels to be snapped into place between the columns 47 and held tightly in position while remaining readily removable. The upper edges of the panels 53 are clamped between the bar 45 and an angle iron 57 by means of machine screws 59.

In Fig. 5, slightly modified panels 53a are provided with inturned flanges 56 on their upper edges, and are thus held against possible downward slipping.

The space between the panels 53 and the outer wall 1 is filled with sound insulating material 54 preferably formed in compressible bats or slabs of slightly greater original thickness than the space between the walls.

The floor assembly 61 is formed by blanking out a piece of sheet metal into the shape shown in Fig. 6, radial corrugations 63 being formed at the same time. Sections 65 are then bent up at right angles to section 64, sections 67 are dished downwardly so as to bring the corners 68 almost but not quite to the level of corrugations 63, and section 69 is bent back upon section 64 and tapped holes 70 made in the doubled portion.

The floor and wall assemblies are joined by welding the lower portion of wall 1 to the upright portion 65 of the floor assembly. A sheet metal spacer 71 is then welded in place on the inside of the lower portion of wall 1, and a composition flooring 73 laid over the floor 64 and up against the spacer 71 for a height of about six inches to form a baseboard 74. A metal protecting strip 75 extends across the floor at the doorway opening and is secured by screws 77 set in the tapped holes 70. The upper edge of the baseboard 74 is secured to the spacer 71 by a U-shaped molding clip 79 which is snapped over and engages the baseboard 74 and a flange 81 extending upwardly from the spacer 71. This molding clip 79 also serves to retain the lower edge of panels 53 forming the inner wall in place. If desired, the molding clips 79 may be formed as an integral part of the panels 53.

A seat 83 is mounted on a spindle 85 which in turn is secured in a base or socket member 87. Bolts 89 secure the base 87 through the baseboard 74 to the spacer 71.

The hollow cylindrical standard 17 is secured to the floor 64 by any suitable means (not shown) and is secured at its upper end in the aperture 15 in ceiling 11. The standard 17 is secured a fixed sleeve 93 carrying a bracket 91 and slidable on the standard 17 are two sleeves 95, 97 carrying brackets 99, 101. Securable to the brackets 91, 99, 101 in two positions so as to be secured at two heights from the floor is backboard 103 and shelf 105 secured thereto, which serve to carry the telephone instrumentalities. Apertures 107 in the standard 17 serve to permit the necessary wiring for the telephone instruments to be carried into the interior of the standard. The specific construction of the telephone stand above described and its connection to the standard 17 is described in more detail in my copending application Serial No. 122,363, filed January 26, 1937, and is specifically claimed therein.

The door 109 of the telephone booth will preferably be formed of sheet metal, and desirably will be of the two leaf type specifically described and claimed in my copending application Serial No. 120,324, filed January 13, 1937. The door, however, may be of any conventional type. It is supported by hinges 111 secured to one of the channel columns 51. The free edge of the door is guided from open to closed position by means of a roller or ball bearing assembly 113 secured in a bracket 115 mounted on the upper edge of the door 109 and traveling in track 117 of channel cross-section supported by brackets 118 secured to the spacer plate 31 and the outer wall 1.

Wiring for the supply of electric current to lights, fan, etc. (not shown), positioned in the space 29 above the ceiling 11 will be brought to the top of the booth, carried around the booth to the point desired in the channel 119 of channel member 21, and passed through apertures 23 to the space 29. These apertures 23 also serve as air inlets to space 29 for ventilation purposes. The telephone wiring will be brought into the space 29 in the same manner and then passed through aperture 15 down the interior of column 17 and so through holes 107 to the telephone instruments on shelf 105. The vertical channel 121 in the side walls of the booth formed by channel member 49 and outer wall 1 may also be used for wiring purposes. Access to this channel may be had through the bottom by piercing the floor 67 and the horizontal portion of spacer 71, through the top by piercing flange 19 of the ceiling, angle iron 57 and Z bar 45, or through the side by piercing only the outer wall 1.

I do not claim specifically herein the floor assembly hereinbefore shown and described, since this is specifically claimed in my copending application Serial No. 120,323, filed January 13, 1937.

What I claim and desire to protect by Letters Patent is:

1. A telephone booth comprising an enclosing wall, an inwardly extending flange-like member secured thereto beneath the upper edge thereof and extending around the booth interior, a channel-member having a flange secured to the upper face of said flange-like member and likewise extending around the booth interior, a roof resting on the opposite flange of said channel member and closing the top of the booth, and a ceiling below and spaced from the roof to form a compartment above the main enclosure, said channel-member constituting a wiring channel open to the space above said flange-like member and having a plurality of openings made in its web to afford communication with the interior of said compartment.

2. A telephone booth comprising an enclosing wall, a false-roof or ceiling extending across the space enclosed by said wall and secured thereto beneath the upper edge thereof, and having an upwardly extending side-wall rising above the level of the point of attachment of the ceiling to the enclosing wall, and a removable roof resting on the upper edge of said ceiling side-wall and having its edges spaced from the top of the said enclosing wall, said ceiling side-wall having a plurality of openings in that part thereof above the said level of attachment.

3. A telephone booth comprising a polygonal outer wall, a plurality of vertical columns of W cross-section positioned in the angles of said wall and secured thereto, and a plurality of sheet metal panels having normally slightly sprung flanges extending rearwardly from the vertically extending edges thereof, said panels being adapted to be positioned between adjacent W-columns to form an inner wall for said booth and to be held in place by frictional engagement of the flanges thereof with the faces of the column members.

4. A telephone booth comprising a polygonal outer wall, a floor, a baseboard extending upwardly from the floor and spaced from said outer wall, a plurality of vertical columns of W cross-section positioned in the angles of said wall and secured thereto, a plurality of sheet metal panels having normally slightly sprung flanges extending rearwardly from the vertically extending edges thereof, said panels being positioned between adjacent W-columns with their flanges engaging the same to form an inner wall for said booth and extending below the upper edge of said baseboard, means detachably securing the upper edges of said panels to the outer wall, and means engaging the upper edge of said baseboard for holding the lower edges of said panels against movement.

5. A telephone booth comprising a polygonal outer wall, a floor, a baseboard extending upwardly from the floor and spaced from said outer wall, a plurality of vertical columns of W cross-section positioned in the angles of said wall and secured thereto, a plurality of sheet metal panels having normally slightly sprung flanges extending rearwardly from the vertically extending edges thereof, said panels being positioned between adjacent W-columns with their flanges engaging the same to form an inner wall for said booth and extending below the upper edge of said baseboard, means detachably securing the upper edges of said panels to the outer wall, means engaging the upper edge of said baseboard for holding the lower edges of said panels against movement, sound-insulating material in the space between the outer wall and the panels and a channel member secured to an inner face of said outer wall and adapted to serve as a wiring conduit.

6. A telephone booth comprising an enclosing wall, a false roof or ceiling extending across the space enclosed by said wall and secured thereto at a point below the upper edge thereof, means extending from the ceiling adjacent its periphery to a point above the level of said point of attachment to the enclosing wall, a removable roof supported on said means, and a plurality of openings in said supporting means above the said level of attachment affording communication to the compartment formed by said roof and ceiling.

7. A telephone booth comprising an enclosing wall, a false roof or ceiling extending across the space enclosed by said wall and secured thereto at a point below the upper edge thereof, means extending from the ceiling adjacent its periphery to a point above the level of said point of attachment to the enclosing wall, a removable roof supported on said means and having its edges spaced laterally from the top of said enclosing wall, and a plurality of openings in said supporting means above the said level of attachment affording communication to the compartment formed by said roof and ceiling.

8. A telephone booth comprising a polygonal outer wall, a floor, a baseboard extending upwardly from the floor and spaced from said outer wall, a plurality of vertically extending corner posts positioned in the angles of said wall and secured thereto, a plurality of sheet metal panels having flanges extending rearwardly from the vertically extending edges thereof, said panels being positioned between adjacent corner posts with their flanges engaging the same to form an inner wall for said booth and extending below the upper edge of said baseboard, means detachably securing the upper edges of said panels to the outer wall, and means engaging the upper edge of said baseboard for holding the lower edges of said panels against movement.

9. A telephone booth comprising a polygonal outer wall, a floor, a baseboard extending upwardly from the floor and spaced from said outer wall, a plurality of vertically extending corner posts positioned in the angles of said wall and secured thereto, a plurality of sheet metal panels having flanges extending rearwardly from the vertically extending edges thereof, said panels being positioned between adjacent corner posts with their flanges engaging the same to form an inner wall for said booth and extending below the upper edge of said baseboard, means detachably securing the upper edges of said panels to the outer wall, means engaging the upper edge of said baseboard for holding the lower edges of said panels against movement, and sound-insulating material in the space between the outer wall and the panels.

PERCIVAL H. SHERRON.